United States Patent
Lin et al.

(10) Patent No.: US 6,282,575 B1
(45) Date of Patent: Aug. 28, 2001

(54) ROUTING MECHANISM FOR NETWORKS WITH SEPARATE UPSTREAM AND DOWNSTREAM TRAFFIC

(75) Inventors: Chihuan Michael Lin, Chandler; John R. Mitkowski, Mesa, both of AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 08/999,679

(22) Filed: Dec. 11, 1997

(51) Int. Cl.[7] ......................... G06F 15/173; G06F 15/177
(52) U.S. Cl. ........................... 709/244; 709/221; 709/238
(58) Field of Search ..................................... 709/238, 244, 709/250, 220, 221; 370/352, 381, 389, 473, 395, 398, 422; 705/39

(56) References Cited

U.S. PATENT DOCUMENTS

| | | | | |
|---|---|---|---|---|
| 5,301,280 | * | 4/1994 | Schwartz et al. | 709/237 |
| 5,592,470 | * | 1/1997 | Rudrapatna et al. | 370/320 |
| 5,678,006 | * | 10/1997 | Valizadeh et al. | 709/223 |
| 5,717,604 | * | 2/1998 | Wiggins | 709/229 |
| 5,732,078 | * | 3/1998 | Arango | 370/355 |

(List continued on next page.)

OTHER PUBLICATIONS

Gibben, R.J. et al., "Dynamic Routing in Multiparented Networks", IEEE/ACM Transactions on Networking, ISSN: 1063–6692, pp. 261–270, Apr. 1993.*

Touch, J. et al., "Dynamic Host Routing for Production use of Development Networks", IEEE Con. on Network Protocols, ISBN: 0–8186–8061–X, pp. 285–292, Oct. 1997.*

Nour, M. et al., "A Dynamic Routing Procedure for Connections with Quality service requirements", IEEE Proc. on Local Computer Networks, ISBN: 0–8186–8141–1, pp. 460–468, Nov. 1997.*

Crawley, E. et al., "A Framework for QoS–based Routing in the Internet", RFC 2386, pp. 1–37, Aug. 1998.*

Chakraborty, D. et al., "Distributed Routing for Dynamic Multicasting with Advance Resource Reservation Information", IEEE Con. on Information Networking, ISBN: 0–7695–0951–7, pp. 603–610, Feb. 2001.*

*Primary Examiner*—Zarni Maung
*Assistant Examiner*—Jason D. Cardone
(74) *Attorney, Agent, or Firm*—Blakely, Sokoloff, Taylor & Zafman LLP

(57) ABSTRACT

What is disclosed is a method having the first step of receiving, on a routing manager port address, a set of accounting request packets from a network access server having a network access server port address. Then, parsing the accounting request packet to derive a command flag and forwarding the set of accounting request packets to an authentication server, having an authentication server port address, over the authentication server port address. The method includes the further step of generating a set of routing table modification commands for a network router based on the command flag. What is also disclosed is an apparatus having a network access server, an authentication server coupled to the network access server, and a routing manager coupled to the network access server and the authentication server. The network access server has a network access server port address, the authentication server has an authentication server port address, and the routing manager has a routing manager port address. The routing manager is configured to: (1) receive, on the routing manager port address, a set of accounting request packets from the network access server port address; (2) parse the accounting request packet to derive a command flag; (3) forward the set of accounting request packets and to the authentication server port address; and (4) generate a set of routing table modification commands for a network router based on the command flag.

26 Claims, 4 Drawing Sheets

U.S. PATENT DOCUMENTS

| | | | | |
|---|---|---|---|---|
| 5,745,556 | * | 4/1998 | Ronen | 379/127 |
| 5,764,789 | * | 6/1998 | Pare, Jr. et al. | 382/115 |
| 5,768,531 | * | 6/1998 | Lin | 709/242 |
| 5,787,253 | * | 7/1998 | McCreery et al. | 709/231 |
| 5,790,548 | * | 8/1998 | Sistanizadeh et al. | 370/401 |
| 5,805,804 | * | 9/1998 | Laursen et al. | 709/223 |
| 5,815,665 | * | 9/1998 | Teper et al. | 709/229 |
| 5,852,812 | * | 12/1998 | Reeder | 705/39 |
| 5,889,955 | * | 3/1999 | Shinozaki et al. | 709/224 |
| 5,898,780 | * | 4/1999 | Liu et al. | 713/155 |
| 5,922,049 | * | 7/1999 | Radia et al. | 709/220 |
| 5,933,832 | * | 8/1999 | Suzuoka et al. | 707/101 |
| 5,958,008 | * | 9/1999 | Pogrebisky et al. | 709/223 |
| 5,970,143 | * | 10/1999 | Schneier et al. | 713/181 |
| 5,974,403 | * | 10/1999 | Takriti et al. | 705/412 |
| 5,978,768 | * | 11/1999 | McGovern et al. | 705/1 |
| 5,987,521 | * | 11/1999 | Arrowood et al. | 709/239 |
| 5,987,611 | * | 11/1999 | Freund | 713/201 |
| 5,991,799 | * | 11/1999 | Yen et al. | 709/218 |
| 6,012,087 | * | 1/2000 | Freivald et al. | 709/218 |
| 6,029,203 | * | 2/2000 | Bhatia et al. | 709/244 |
| 6,031,904 | * | 2/2000 | An et al. | 379/201 |
| 6,041,123 | * | 3/2000 | Colvin, Sr. | 713/153 |
| 6,178,455 | * | 1/2001 | Schutte et al. | 709/228 |

* cited by examiner

ROUTING MECHANISM FOR NETWORKS WITH SEPARATE UPSTREAM AND DOWNSTREAM TRAFFIC

BACKGROUND

1. Field of the Invention

The invention relates to the art of computer networks. In particular, the invention provides method and apparatus for accomplishing an automatic routing of separate upstream and downstream traffic in networks with one-way network devices.

2. Description of Related Art

Currently, most home personal computers (clients) are connecting with the Internet and other on-line services using the public telephone network Most often, data is transferred using Transmission Control Protocol/Internet Protocol (TCP/IP) implemented over such protocols as the Point-to-Point Protocol (PP) or Serial Line IP (SLIP). PPP and SLIP allow clients to become part of a TCP/IP network (such as the internet) using the public telephone network and either an analog public service telephony network (PSTN), modem or an Integrated Services Digital Network (ISDN) device. Clients connect to a network by "dialing-up" a Point of Presence (POP), or "headend", server, which then assigns the client an IP address.

The public telephone network has a switched point-to-point architecture and only offers relatively low bandwidth as it was originally designed for analog voice communication. Thus, it does not scale well to the delivery of broadband data such as multimedia As a result, there are several efforts to create a broadband data delivery infrastructure for client applications. Such an infrastructure, when combined with the increasingly powerful clients that are now available, will enable the delivery of rich multimedia programming to the home.

Broadband data delivery may be accomplished over a variety of different delivery infrastructures. Of these, perhaps the most promising is the infrastructure currently used to deliver cable television. Recent advancements in radio frequency modulation and demodulation technology, along with a large base of cable television subscribers, has made cable television service providers a strong candidate for becoming the preferred provider of broadband services to the home. In the broadband network architecture, a client will be continuously connected to the broadband network and will be in communication with one or more headend servers at all times.

However, as the cable television network was originally intended only for transmitting data from a headend server located at the cable television service provider's site to one or more subscribers/users (i.e., the network was designed for a one-to-many transmission of information), no provision was made for receiving data from the equipment (i.e., clients) located at the users' locations.

A solution has been proposed to achieve two-way communication of data using the existing cable television infrastructure. "Downstream data", defined to be data sent from a headend server to a client, is transferred over coaxial cable from the headend server into the home and to the user's client PC, while "upstream data", defined to be data sent from the client to the headend server, is transferred over the public telephone network. The asymmetrical allocation of upstream/downstream bandwidth is acceptable for most applications as the majority of users requires a larger downstream bandwidth compared to the upstream bandwidth (i.e., most users are "data consumers" rather than "data generators").

In operation, downstream data is received by a client using a "one-way" cable modem while upstream data is transmitted by an analog modem or an ISDN device, over the public telephone network, to the headend server via a Plain Old Telephone Service (POTS) server at the headend office. The POTS server forwards any upstream data sent by the client to the headend server for appropriate action (e.g., providing domain name server (DNS) services, simple mail transfer protocol (SMTP) services, gateway or proxy services, etc.).

The client and the headend server communicate using TCP/IP. Data is transmitted in packets, where packets are defined as a block of data with appropriate transmission data attached in the form of a header and footer to be sent or received over a network. Downstream and upstream data are sent using the Ethernet standard, as defined by the Institute of Electrical and Electronics Engineemrs (IEEE) 802.3, modulated for transmission over: (1) coaxial cable using the cable modem; or, (2) a telephone line using the PSTN modem or the ISDN device and PPP or SLIP protocols.

In order for the client to use the cable modem for communication, the cable-modem is installed as an Ethernet adapter in the client, and the client is configured just as an ordinary TCP/IP network machine. Thus, the client would have both a media access control (MAC) address for the Ethenet adaptor and a TCP/IP address. After the initial configuration and initialization of the cable modem, data would come from the headend server over the coaxial cable in the cable network.

For downstream traffic to reach the client through the cable modem, however, the network router that is responsible for routing network traffic for the client at the headend server side need to be set-up to divert all downstream traffic to the client. Currently, each new client must be added manually to the routing tables of the network router using fixed IP addresses so that the internet service provider must maintain an IP address for each client. As each client has to be manually added, an additional burden is placed on the system administrator for supporting each client In addition, this system wastes IP addresses as not all clients are usually communicating with the network at the same time. If clients could be assigned IP addresses dynamically from a pool of addresses, then the service provider needs to maintain and reserve a number of IP addresses based on the potential number of IP addresses he might need to support What is needed is a network routing mechanism that will automatically set-up network traffic routing in networks with separate upstream and downstream traffic traveling over different transmission mediums, such as one-way cable systems. Currently, there are no existing implementations of a network router that will accomplish this type of routing automatically. Moreover, the network routing mechanism should allow dynamic allocation of IP addresses so that only one IP address is needed for each client and IP addresses can be conserved.

SUMMARY

A system which will allow the automatic set-up of a session between the client and the network over separate upstream and downstream channels includes a method having the first step of receiving, on a routing manager port address, a set of accounting request packets from a network access server having a network access server port address. Then, parsing the accounting request packet to derive a command flag and forwarding the set of accounting request packets to an authentication server, having an authentication server port address, over the authentication server port address. The method includes the further step of generating a set of routing table modification commands for a network router based on the command flag. The system contains a network access server, an authentication server coupled to the network access server, and a routing manager coupled to the network access server and the authentication server. The network access server has a network access server port address, the authentication server has an authentication server port address, and the routing manager has a routing manager port address. The routing manager is configured to: (1) receive, on the routing manager port address, a set of accounting request packets from the network access server port address; (2) parse the accounting request packet to derive a command flag; (3) forward the set of accounting request packets and to the authentication server port address; and (4) generate a set of routing table modification commands for a network router based on the command flag.

DETAILED DESCRIPTION

The present invention provides a method and apparatus for networks with separate upstream and downstream traffic. For purposes of explanation, specific embodiments are set forth to provide a thorough understanding of the present invention. However, it will be understood by one skilled in the art, from reading this disclosure, that the invention may be practiced without these details. Further, although the present invention is described through the use of network with separate PSTN modem upstream and cable modem downstream traffic, most, if not all, aspects of the invention apply to networks in general. Moreover, well-known elements, devices, process steps and the like are not set forth in detail in order to avoid obscuring the present invention.

Figure 1:
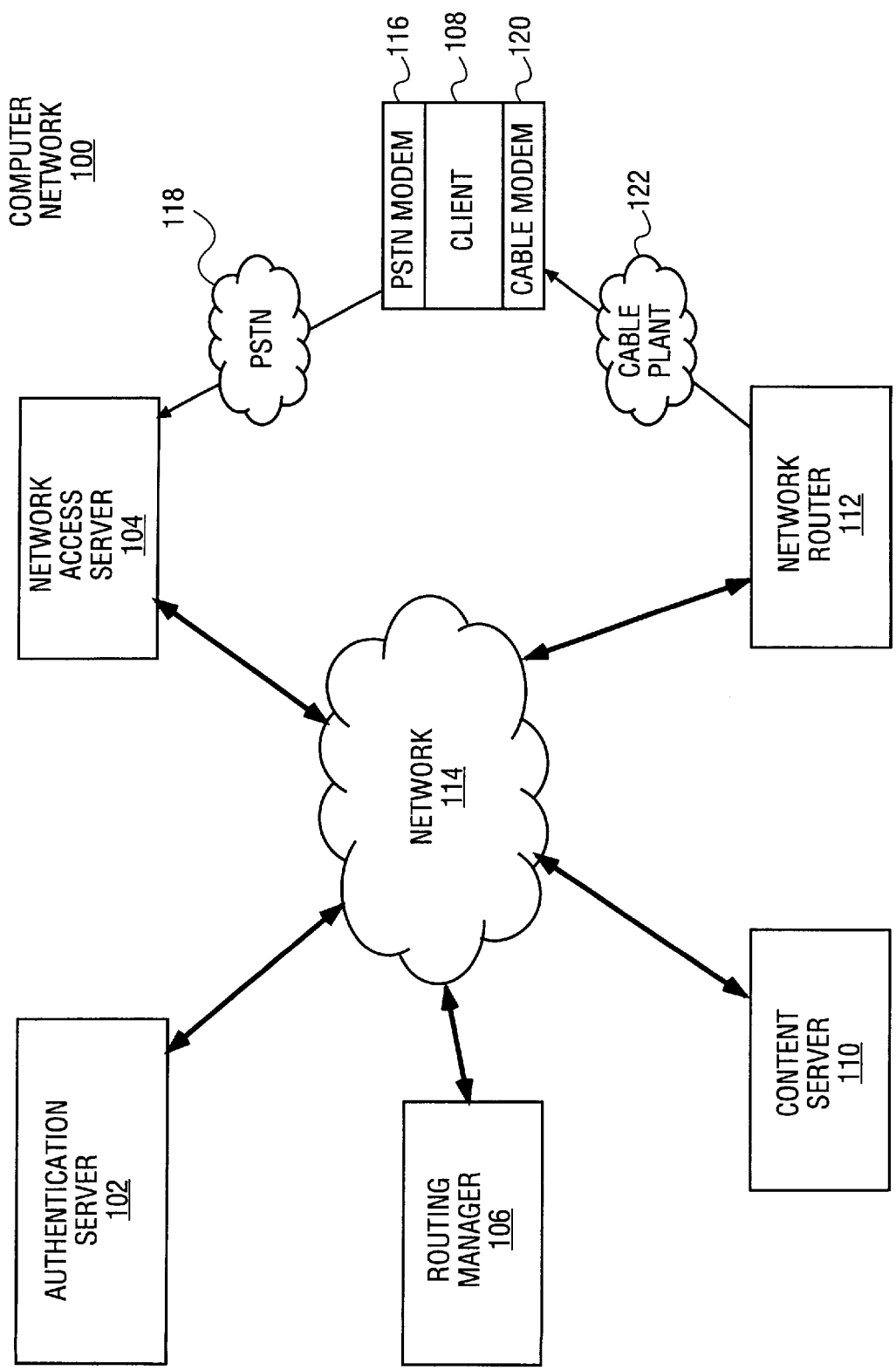
FIG. 1 illustrates a computer network configured in accordance with one embodiment of the present invention.

FIG. 1 illustrates a computer network 100 configured in accordance with one preferred embodiment of the present invention having an authentication server 102, a network access server 104, a routing manager 106, a client 108, a content server 110, and a network router 112. Authentication server 102, network access server 104, routing manager 106, content server 110, and network router 112 are coupled to and communicate with each other through a network 114. In one preferred embodiment, network 114 is a transmission control protocol/internet protocol (TCP/IP) network. In other embodiments, network 114 is a network which uses other network protocols for the transferring of information.

Client 108 is coupled to and communicates with: (1) network access server 104 through the use of a PSTN modem 116 and a public service telephony network (PSTN) 118; and, (2) network router 112 through the use of a cable modem 120 and a cable plant 122. In one embodiment, PSTN modem 116 is one which operates on standard telephone lines. In an alternate embodiment, PSTN modem 116 is one that operates over the wireless spectrum. In yet another embodiment, PSTN modem 116 can be replaced with an integrated services digital network (ISDN) modem, which is digital in technology. PSTN 118 can support and receive all transmission technologies mentioned above, and can also be upgraded with different technologies as they appear. Also, cable modem 120 has an integrated network adaptor that conforms with a standard such as the Institute of Electrical and Electronic Engineers (IEEE) 802.3 (Ethernet) standard. In another embodiment, client 108 can also contain a network access device (not shown) to communicate with cable modem 120. In this other embodiment, network access device conforms to a standard such as the Ethernet standard In either embodiment, the network adaptor portion of client 108 has a media access control (MAC) address. According to the Ethernet standard, the MAC address is unique to each network adaptor. Thus, the MAC address of the network adaptor (and thus, client 108), is unique in computer network 100.

Network access server 104 provides dial-up services to client 108. In one embodiment, network access server 104 includes a set of modems (e.g., a "modem-bank") along with control hardware, which is capable of servicing multiple clients concurrently. The set of modems can be a mix of analog and digital modems. Network access server 104 is also responsible for assigning IP addresses to client 108 based on a dynamic IP assignment scheme such as dynamic host configuration protocol (DHCP). In another embodiment, each client can have a pre-assigned, static IP address. In yet another embodiment, network access server 104 can service both clients with static IP addresses and clients with dynamic IP addresses. During a call-setup, when a client dials into network access server 104, network access server 104 communicates with authentication server to verify the user is a valid user to the system.

Authentication server 102 is used to provide authentication services for client computer systems such as client 108. In one embodiment, authentication server 102 is connected to a database that contains all valid client user names and passwords. When provided with a user name and a password, authentication server 102 performs a look-up in the database and determines if the user name exists and the password assigned to that user name is correct Authentication server 102 then responds with the authentication results. Authentication server 102 also logs all requests for connections for accounting purposes. For example, if the services are provided by a commercial internet service provider.

Routing manager 106 is used to automatically set-up a communication session with client 108 with upstream and downstream traffic on separate devices. The details of the operation of routing manager 106 is discussed further, in FIG. 4, below.

Each of authentication server 102, network access server 104, routing manager 106 has a user datagram protocol (UDP) port number. The UDP port number of each machine is used by other machines to send data packets between them. Thus, for example when authentication server 102 is sending a packet to routing manager 106, it will send it to the UDP port of routing manager 106.

It is to be noted that the functionality provided by authentication server 102, network access server 104, routing manager 106, content server 110, and network router 112 can be contained in one or more computer systems. For example, the functions as provided by authentication server 102 and network access server 104 are implemented on two separate systems. Conversely, the functions offered by authentication server 102, routing manager 106, and content server 110 can be provided by multiple systems. Thus, authentication server 102 can be implemented as a series of authentication servers that handle authentication requests on a distributed basis (e.g., a "round-robin" request load distribution system).

Figure 2:
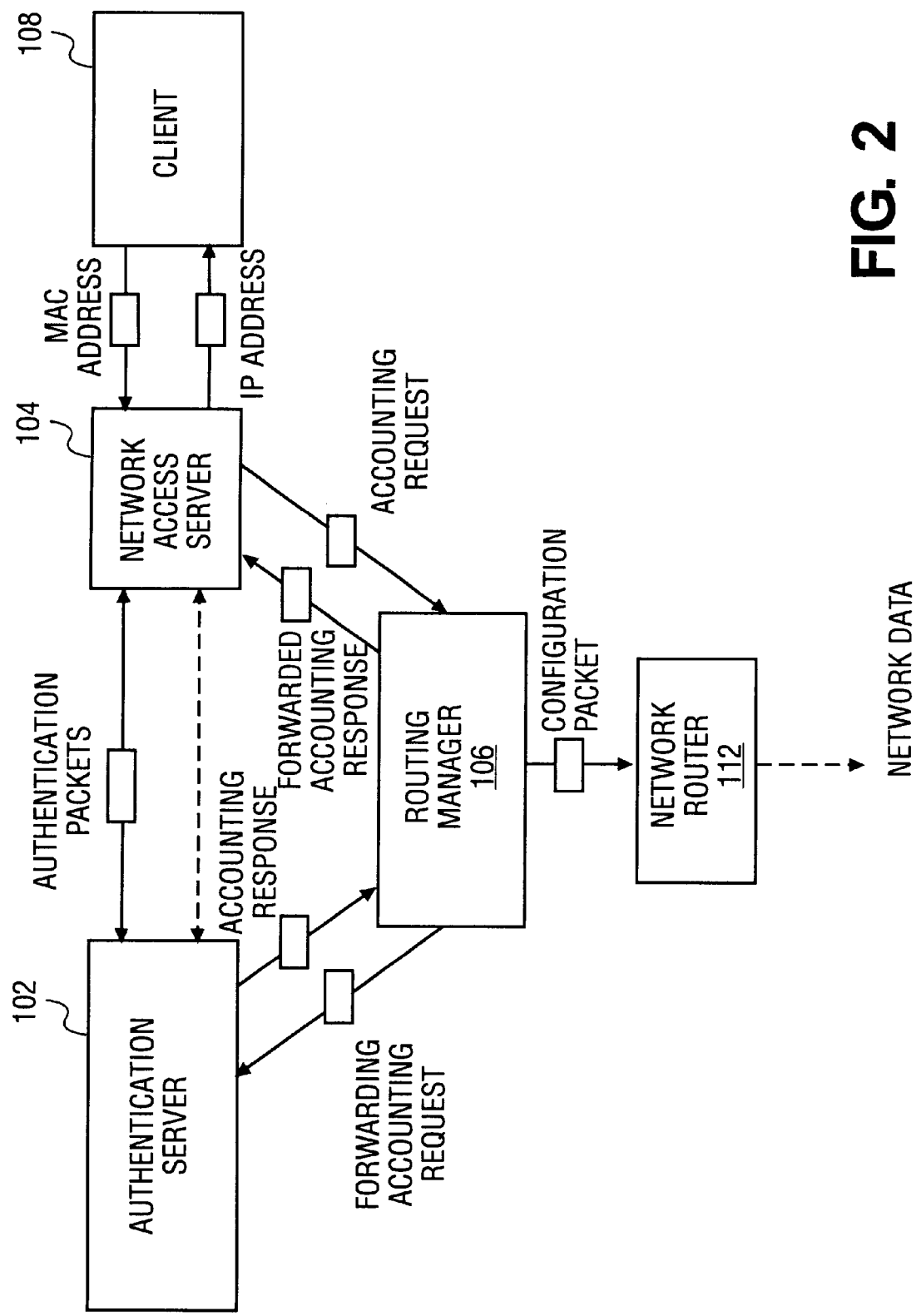
FIG. 2 is a block diagram illustrating the process of the operation of the components in the computer network
Figure 3:
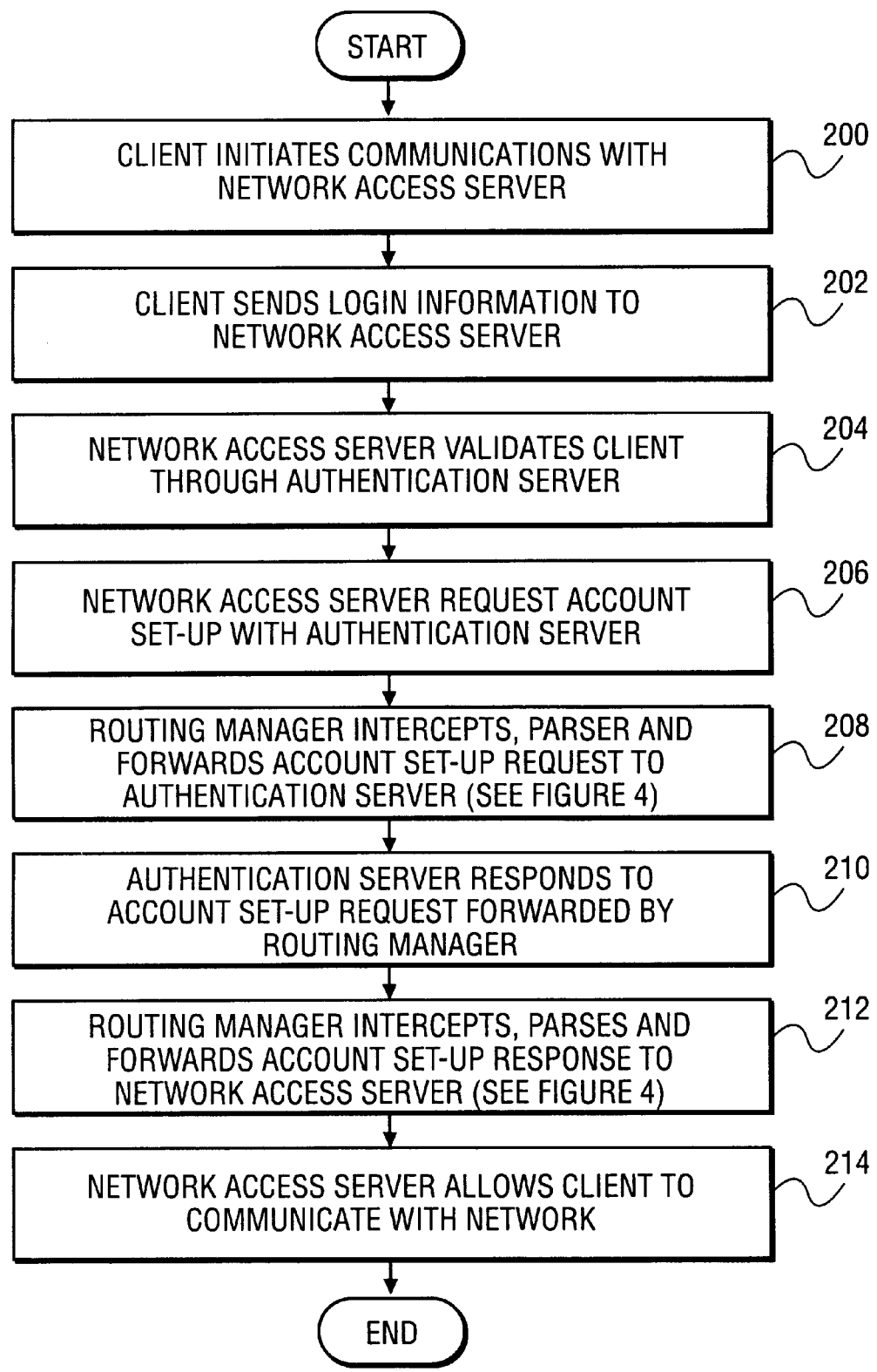
FIG. 3 is a flow diagram of the process of the operation of the components in the computer network.

FIG. 2 is a block diagram of the operation of authentication server 102, network access server 104, routing manager 106, client 108, and network router 112, in accordance with one preferred embodiment of the present invention. FIG. 3 is a flow diagram of the operation of the system in FIG. 2. Explanation of FIG. 3 will be made with references to FIG. 2.

In step 200 of FIG. 3, client 108 initiates communications with network access server 104 to establish a session Client 108 initiates the connection by dialing-up network access server 104 with PSTN modem 116. After the initial handshaking and setup has been performed between client 108 and network access server 104, client 108 communicates with network access server 104 to send the login information for client 108 in step 202. In one embodiment, an username and a password is sent to network access server 104, with the MAC address being used as the username and the password being a pre-determined password chosen by the user. In another embodiment, only the MAC address (i.e., the MAC address of the network adaptor of client 108) is sent as a username, with no passwords being used.

In step 204, after network access server 104 receives the MAC address of client 108, network access server 104 then communicates with authentication server 102 to validate that client 108 is a valid client by sending and receiving authorization packets from authentication server 102. As described in step 202, a user name and a password is sent from network access server 104 to authentication server 102 in one embodiment. The user name would be the MAC address of client 108, and the password would be a predetermined password chosen by the user of client 108. In another embodiment, the authentication server 102 is used to query that the MAC address of client 108 is a valid MAC address in the system. After the client has been authenticated by authentication server 102, network access server 104 will send IP address to client 108 if client 108 is a client that requires a dynamically assigned IP address. In another embodiment, network access server 104 assigns an IP address to client 108 as soon as communication is established with client 108, as in step 200.

In step 206, after network access server 104 transmits the IP address to client 108, it also submits an accounting request packet to the UDP port of the machine that is responsible for authentication requests.

In step 208, for one embodiment, the UDP port number to which network access server 104 sends the accounting request packet is actually set to be the UDP port number of routing manager 106 and not authentication server 102. Network access server 104 is not aware that routing manager 106 is "intercepting" the packet. When the packet is intercepted by routing manager 106, routing manager 106 both (1) forwards the accounting request packet to authentication server 102 to reduce any latency introduced by routing manager 106 intercepting the packet; and, (2) performs any actions needed with the information in the packet, such as sending a configuration packet to network router 112 to configure network router 112 so that the downstream traffic will be sent to client 108. The operation of routing manager 106 is discussed in further detail in FIG. 4, below.

In step 210, after authentication server 102 receives the forwarded accounting request packet from routing manager 106, it will send an accounting response packet back to the requestor, which is routing manager 106. Authentication server 102 is not aware that the requestor is routing manager 106, but thinks that the requestor is network access server 104. In one embodiment, authentication server 102 also performs as the accounting server to track the usage of client 108 for billing purposes.

In step 212, routing manager 106 will "intercept" the accounting response packet as it has the UDP port address of the machine to which authentication server 102 is supposed to respond for all authentication requests. After routing manager 106 intercepts the accounting request packet, routing manager 106 then forward the accounting response packet to network access server 104. At the same time, routing manager 106 will operate in accordance with what is contained in the accounting response packet. The functions performed by routing manager 106 in step 212 is further described in FIG. 4, below.

In step 214, network access server 104 allows client 108 to begin communications with the network to access such servers as content server 110 in FIG. 1. As described below in FIG. 4, Network router 112 is configured through the use of a configuration packet sent from routing manager 106 during step 208. Thus, during normal operation, client 108 will send all upstream traffic using PSTN modem 116 to network access server 104 and receive all downstream traffic from network router 112 through the use of cable modem 120 via cable plant 122.

Figure 4:
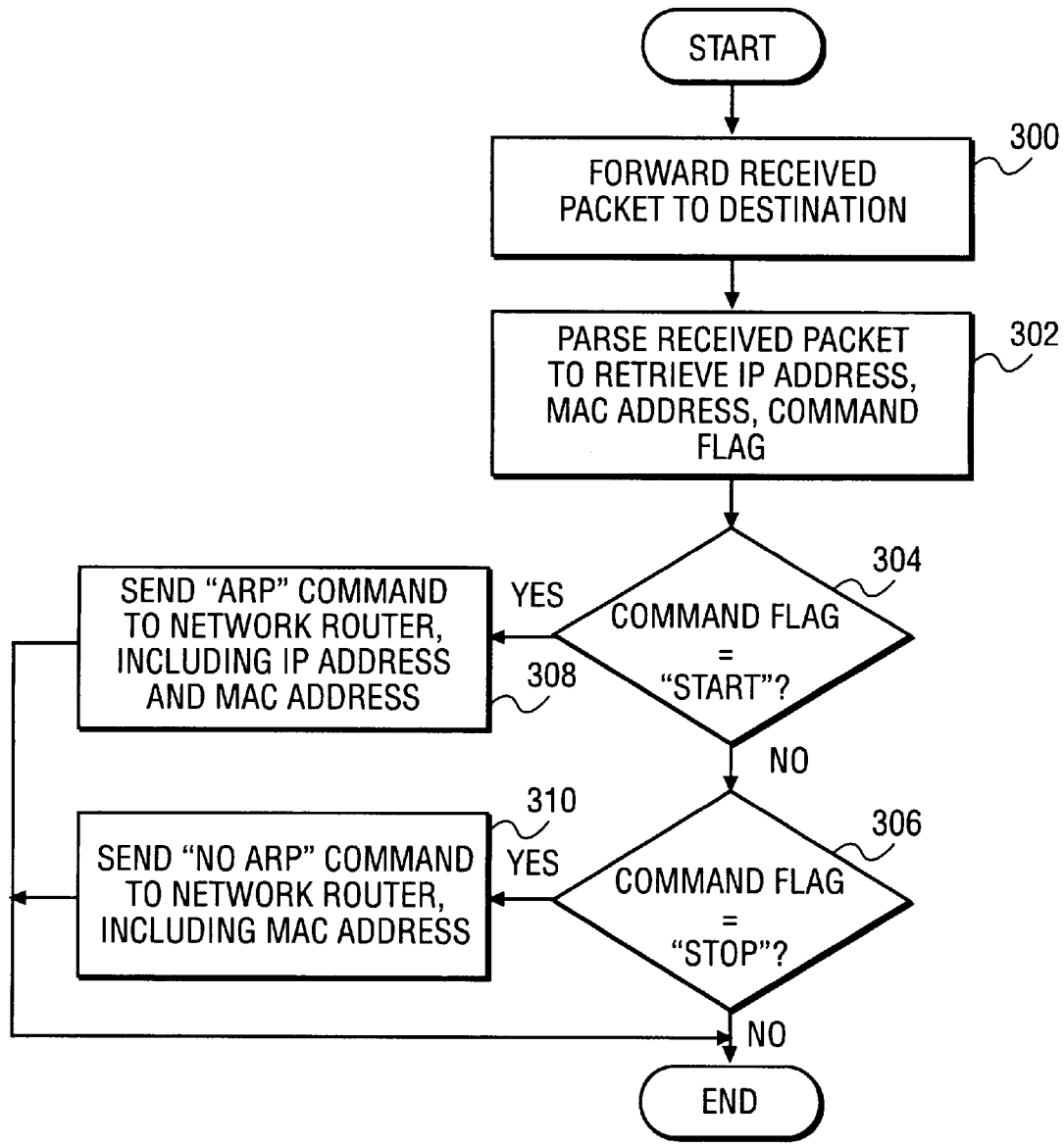
FIG. 4 is a flow diagram of the process of the operation of a routing manager in the computer network in accordance with one embodiment of the present invention.

FIG. 4 is a flow diagram illustrating the operation of routing manager 106 in more detail. Operation begins when routing manager 106 receives the accounting request packet from network access server 104. The accounting request packet contains the IP address and the MAC address of client 108, and a COMMAND flag. In step 300, routing manager 106 will forward the received accounting request packet to the appropriate destination, in which case it is the authentication server 102.

As stated above, network access server 104, authentication server 102, and routing manager 106 are each assigned a UDP port number. In operation, network access server 104 is configured to send authorization packets to the UDP port number of authentication server 102, and to send accounting request packets to the UDP port of routing manager 106. Similarly, authentication server 102 is configured to send authorization packets to the UDP port of network access server 104, and accounting response packets to routing manager 106. Routing manager 106 responds differently depending on the detected sender of a received packet. When routing manager 106 detects that the UDP port of the sender is network access server 104, routing manager 106 will forward the received packet to the UDP port of authentication server 102. Routing manager 106 will then forward the accounting response to network access server 104 on the UDP port of network access server 104.

In step 302, routing manager 106 will parse the received accounting request packet to retrieve the IP address and the MAC address of client 108. Routing manager 106 will also extract the COMMAND flag. Operation will then continue with step 304.

In step 304, routing manager 106 will examine the COMMAND flag and determine if it is equal to a "START" command. If the COMMAND flag is a START command, then operations will continue with step 308. Otherwise, operation will continue with step 306.

In step 306, routing manager 106 will examine the COMMAND flag to see if it equals the "STOP" command. If the COMMAND flag is equal to the STOP command, then operations will end. Otherwise, operations will continue with step 301.

In step 308, as the COMMAND flag is equal to the START command, routing manager will send an address resolution protocol (ARP) continuing command to network router 112, which includes the IP address and the MAC address of client 108. The ARP command to network router 112 will insert an entry into the tables of network router 112 that will associate the IP address to the MAC address such that all traffic destined for the IP address will be transmitted to the MAC address. As the MAC address is the address of cable modem 120 of client 108, all data which is received that is destined for the IP address of client 108 will be sent to the MAC address of client 108, specifically, to cable modem 120. After routing manager 106 sends the ARP command to network router 112, operations will then end.

In step 310, routing manager 106 will send another ARP command to network router 112, which includes the MAC address of client 108. This is in response to the STOP command parsed by routing manager 106 in step 306. This ARP command will cause network router 112 to remove the entry containing the MAC address of client 108, and therefore not transfer any downstream traffic to client 108. The accounting request packet that contains the "STOP" command is generated based on a disconnect request of client 108 that is sent to network access server 104. Network access server 104 can also generate the "STOP" command in cases where client 108 is somehow disconnected from network access server 104, due to poor line conditions or other conditions.

While the present invention has been particularly described with reference to the various figures, it should be understood that the figures are for illustration only and should not be taken as limiting the scope of the invention. Many changes and modifications may be made to the invention, by one having ordinary skill in the art, without departing from the spirit and scope of the invention.

What is claimed is:

1. An apparatus comprising:
a network access server to receive upstream packets from a client, the server having a network access server port address;
an authentication server having an authentication server port address coupled to said network access server;
a routing manager having a routing manager port address coupled to said network access server and said authentication server;
wherein said routing manager is configured to: (1) receive, on said routing manager port address, a set of accounting request packets from said network access server port address; (2) parse said accounting request packet to derive a command flag; (3) forward said set of accounting request packets to said authentication server port address; and (4) generate a set of routing table modification commands for a network router based on said command flag, the network router to route downstream packets to the client.

2. The apparatus of claim 1, wherein said network access server is to communicate with the client and receive authentication information from said client.

3. The apparatus of claim 2, wherein said network access server is to send a set of authentication packets to said authentication server on said authentication server port address, said set of authentication packets containing said received authentication information.

4. The apparatus of claim 3, wherein said authentication server is configured to respond to said set of authentication packets by sending a second set of authentication packets to said network access server based on said received authentication information.

5. The apparatus of claim 2, wherein said received authentication information contains an address of a network adapter of said client, the address and an Internet protocol (IP) address of the client being received by the routing manager in said accounting request packets and provided to the network router, so that the IP address of the client is associated with the network adapter address in an entry of a routing table of the network router.

6. The apparatus of claim 1, wherein said command flag is a "START" command, and said set of routing table modification commands enters an entry in a routing table of said network router.

7. The apparatus of claim 2 wherein said authentication information includes a media access control (MAC) address of said client, the MAC address and an Internet protocol (P) address of the client being received by the routing manager in said accounting request packets and provided to the network router, so that the IP address of the client is associated with the network adapter address in an entry of a routing table of the network router.

8. The apparatus of claim 1, wherein said command flag is a "STOP" command, and said set of routing table modification commands removes an entry in a routing table of said network router.

9. The apparatus of claim 1 wherein the upstream packets are to be received from the client only using a dial-up connection, and the downstream packets are to be delivered to the client only using a network adapter connection.

10. The apparatus of claim 1 wherein the network access server is not to deliver downstream packets to the client.

11. A method comprising:
receiving, on a routing manager port address, a set of accounting request packets from a network access server having a network access server port address, the network access server to receive upstream packets from a client;
parsing said accounting request packet to derive a command flag;
forwarding said set of accounting request packets to an authentication server having an authentication server port address; and
generating a set of routing table modification commands for a network router based on said command flag, the network router to route downstream packets to the client.

12. The method of claim 11, further comprising the step of communicating with a client to receive authentication information from said client.

13. The method of claim 12, further comprising sending a set of authentication packets to said authentication server on said authentication server port address, said set of authentication packets containing said received authentication information.

14. The apparatus of claim 13, further comprising responding to said set of authentication packets by sending a second set of authentication packets to said network access server based on said received authentication information.

15. The method of claim 12, wherein said received authentication information contains an address of a network adapter of said client, the address and an Internet protocol (IP) address of the client being received by the routing manager in said accounting request packets and provided to the network router, so that the IP address of the client is associated with the network adapter address in an entry of a routing table of the network adapter.

16. The method of claim 12 wherein said authentication information includes a media access control (MAC) address of said client, the MAC address and an Internet protocol (IP) address of the client being received by the routing manager in said accounting request packets and provided to the network router, so that the IP address of the client is associated with the network adapter address in an entry of a routing table of the network adapter.

17. The method of claim 11, further comprising removing an entry in a routing table of said network router if said command flag is a "STOP" command.

18. The method of claim 11, further comprising entering an entry in a routing table of said network router if said command flag is a "START" command.

19. The method of claim 11 wherein the upstream packets are to be received from the client only using a dial-up connection, and the downstream packets are to be delivered to the client only using a network adapter connection.

20. The method of claim 11 wherein the set of accounting packets are received from a network access server that is further configured not to deliver downstream packets to the client.

21. An article of manufacture comprising:
a machine-readable medium having instructions stored therein which, when executed by a set of processors, cause:
receiving, on a routing manager port address, a set of accounting request packets from a network access server having a network access server port address, the network access server to receive upstream packets from a client;
parsing said accounting request packet to derive a command flag;
forwarding said set of accounting request packets to an authentication server having an authentication server port address; and
generating a set of routing table modification commands for a network router based on said command flag, the network router to route downstream packets to the client.

22. The article of manufacture of claim 21 wherein the machine-readable medium has further instructions that cause communicating with a client to receive authentication information from said client.

23. The article of manufacture of claim 22 wherein the machine readable medium has further instructions that cause sending a set of authentication packets to said authentication server on said authentication server port address, said set of authentication packets containing said received authentication information.

24. The article of manufacture of claim 23 wherein the machine readable medium has further instructions that cause responding to said set of authentication packets by sending a second set of authentication packets to said network access server based on said received authentication information.

25. The article of manufacture of claim 22 wherein said authentication information includes a media access control (MAC) address of said client, the MAC address and an Internet protocol (IP) address of the client being received by the routing manager in said accounting request packets and provided to the network router, so that the IP address of the client is associated with the network adapter address in an entry of a routing table of the network adapter.

26. The article of manufacture of claim 22 wherein said received authentication information contains an address of a network adapter of said client, the address and an Internet protocol (IP) address of the client being received by the routing manager in said accounting request packets and provided to the network router, so that the IP address of the client is associated with the network adapter address in an entry of a routing table of the network adapter.

* * * * *